(12) United States Patent
Morsillo et al.

(10) Patent No.: US 7,814,013 B2
(45) Date of Patent: Oct. 12, 2010

(54) ELECTRONIC PAYMENT PROCESSING SYSTEM

(76) Inventors: Leon N. Morsillo, 1583 Swamp Creek Rd., Pennsburg, PA (US) 18073; Terry H. Zeigler, 16 Meadow La., Quakertown, PA (US) 18951

( * ) Notice: Subject to any disclaimer, the term of this patent is extended or adjusted under 35 U.S.C. 154(b) by 0 days.

(21) Appl. No.: 11/959,926

(22) Filed: Dec. 19, 2007

(65) Prior Publication Data

US 2008/0147552 A1 Jun. 19, 2008

Related U.S. Application Data

(60) Provisional application No. 60/870,642, filed on Dec. 19, 2006.

(51) Int. Cl.
G06Q 40/00 (2006.01)
G06F 19/00 (2006.01)
G06F 9/44 (2006.01)
G06F 12/00 (2006.01)

(52) U.S. Cl. .................. 705/40; 705/41; 235/379; 235/385

(58) Field of Classification Search ............ 714/3; 235/379, 385; 717/172, 173; 711/124, 117, 711/122, 127, 157
See application file for complete search history.

(56) References Cited

U.S. PATENT DOCUMENTS

| | | | | |
|---|---|---|---|---|
| 5,812,668 | A * | 9/1998 | Weber | 705/79 |
| 2003/0222135 | A1 * | 12/2003 | Stoutenburg et al. | 235/379 |
| 2003/0236950 | A1 * | 12/2003 | Clarke et al. | 711/144 |
| 2007/0050751 | A1 * | 3/2007 | Husmann et al. | 717/105 |

OTHER PUBLICATIONS

Netopia Introduces netOctopus POS Manager; netOctopus to Provide Simple High-speed and Secure Deployment and Management Capabilities Business Wire. New York: Apr. 20, 2004, p. 1.*

Paymentech Product Education Services, Chapter 4 Download Procedures, Hypercom ICE, Jan. 2002, pp. 4-1—4-7.

Hypercom, Chapter 3 Terminal Setup Procedures, T7 Plus Hardware and Installation Manual, Apr. 30, 2002, pp. 3-26—3-28, Revision A.

(Continued)

*Primary Examiner*—Hani Kazimi
*Assistant Examiner*—William Rankins
(74) *Attorney, Agent, or Firm*—Ryder, Lu, Mazzeo & Konieczny LLC; Douglas J. Ryder

(57) ABSTRACT

In general, in one aspect, parties associated with a merchant profile may be provided access to a system utilized to create merchant profiles. The system may accept data related to a merchant account from the parties and may validate the data. If any required information is missing or invalid the system may notify the parties. Once all the data is received and validated the system processes the data to create the merchant profile. The merchant profile may be stored in the system for the merchant. The merchant profile may be associated with a unique ID associated with a payment handler utilized by the merchant. The merchant or associated parties may utilize the unique ID to configure the payment handler including downloading processor software. The system may utilize the unique ID to manage and control use of the payment handlers and the processor applications.

20 Claims, 12 Drawing Sheets

OTHER PUBLICATIONS

Verifone, Chapter 3 Downloading and Chapter 7 Entering Transaction Parameters, Tranz 330 Reference Manual, date unknown, pp. 3-1—3-7 and 7-1—7-9, Revision 3.01.
Verifone, TCLoad Reference Manual, date unknown, pp. 1-1—4-9, Revision 1.0.
Verifone, Chapter 5 Programming the FDR XL Terminal for Use and Appendix D ZonTalk Download Parameters, Zon Jr. XL/XL 300 FDR XL Enhancement Reference Manual, date unknown, pp. 5-1—5-5 and D-1—D-5, Revision 1.0.
Datacap Systems, Payment Solutions Overview, Jul. 8, 2009, 1 page.
Datacap Systems, IPTran, Aug. 26, 2009, 2 pages.
Datacap Systems, DialTran, Jan. 2, 2008, 2 pages.
Datacap Systems, TwinTran, Sep. 16, 2008, 2 pages.
Datacap Systems, What is AutoLoad, Jul. 9, 2009, 1 page.
Datacap Systems, AutoLoad, Aug. 26, 2009, 2 pages.
Datacap Systems, PSCS, Aug. 26, 2009, 2 pages.
Datacap Systems, DataTran Initiated Dial-In Download, date unknown, 2 pages.
Datacap Systems, SPS (ADS) Host merchant profile worksheet, date unknown, 2 pages.

* cited by examiner

ELECTRONIC PAYMENT PROCESSING SYSTEM

PRIORITY

This application claims the priority under 35 USC §119 of Provisional Application 60/870,642 entitled "Method to deploy hardware and software payment systems" filed on Dec. 19, 2006 and having Leon N. Morsillo and Terry H. Zeigler as inventors. Application 60/870,642 is herein incorporated by reference in its entirety but is not prior art.

BACKGROUND

Today most merchants, whether brick and mortar or Internet, accept electronic payments (e.g., credit cards, debit cards, gift cards) as tender for transactions. Electronic payments may also be accepted by vending machines, kiosks, automated tellers or other systems where a human is not needed to conduct the transaction or process an electronic payment as tender for the transaction.

FIG. 1 illustrates an example architecture used to process electronic payments for merchant transactions. The architecture includes a merchant system 110, a payment handler 120, a communication network 130, and a payment processing system 140. The merchant system 110 may be a hardware system (e.g., electronic cash register (ECR), point of sale (POS)) or may be a software system (e.g., POS). The merchant system 110 may track items purchased and generate an invoice/sales receipt based on the cost of those items purchased and any taxes and/or discounts applied. The merchant system 110 may include an interface for gathering data about purchased items. The interface may include, but is not limited to, a scanner to scan codes associated with items (e.g., UPC codes), a keyboard to enter data associated with items, or a touch screen to select items. The merchant system 110 may be tied to other systems (e.g., inventory system, management system). The merchant system 110 may also include an interface to gather electronic payment information (e.g., card number). The interface may include, but is not limited to, a card reader (swiper), a scanner, a keyboard, or a touch screen.

The payment handler 120 may process the electronic payment information and purchase transaction data (e.g., payment amount) to create electronic payment transactions and communicate the electronic payment transactions to the payment processing system 140. The payment handler 120 may be separate from the merchant system 110, interfaced to the merchant system 110 or integrated into the merchant system 110. The payment handler 120 may receive the payment amount from the merchant system 110 or the payment amount may be entered into payment handler 120. The payment handler 120 may receive the electronic payment information from the merchant system 110 or an electronic payment information device (not illustrated) connected to the payment handler 120, or the electronic payment information may be entered into payment handler 120. The payment handler 120 may include an interface to gather the electronic payment information. The interface may include, but is not limited to, a card reader, a scanner, a keyboard, or a touch screen.

The payment handler 120 may be configured to operate with a specific payment processing system 140 (create electronic payment transactions in format required). The payment handler 120 may also be configured for a specific merchant-payment processor relationship (merchant account). The configuration of the payment handler 120 is discussed in more detail later.

The communication network 130 provides communications between the payment handler 120 and the payment processing system 140. The communication network 130 may be a phone network, the Internet and/or a wireless network.

The payment processing system 140 receives and processes the electronic payment transactions from the payment handler 120. The electronic payment transactions received may include information related to the transaction (e.g., payment amount), information related to the electronic payment used (e.g., card number), and information related to the merchant (e.g., merchant identifying information). The payment processing system 140 may determine if the electronic payment transaction received is authorized for the merchant (e.g., does merchant accept that type of credit card) and can be processed (e.g., is transaction amount within card limit of the purchaser). Once the transaction is authorized/approved, the payment processing system 140 may process payment from the card company to the merchant based on identification of the merchant included in the electronic payment transaction.

FIGS. 2A-2C illustrate several example merchant system-payment handler architectures. FIG. 2A illustrates an architecture where the merchant system 110 and the payment handler 120 are separate devices that are not interfaced together or communicating directly with one another. The merchant system 110 does not communicate payment amount to the payment handler 120 so the payment amount needs to be entered (manually) into the payment handler 120. The payment handler 120 may include a user interface (e.g., keyboard) for entering the payment amount. Additionally, cross referencing may be required between the purchases processed in the merchant system 110 and the electronic payment transactions processed in the payment handler 120. The payment handler 120 may include an electronic payment interface (e.g., card reader, scanner, keyboard) for accepting data related to the consumer and their electronic payment (e.g., credit card number). The payment handler 120 is used as a data terminal to enter payment amount and electronic payment information.

FIG. 2B illustrates an architecture where the merchant system 110 and the payment handler 120 are separate devices that are interfaced together and communicate therebetween. The merchant system 110 provides the payment amount to the payment handler 120. The merchant system 110 may include an electronic payment interface for accepting electronic payment information and may provide the electronic payment information to the payment handler 120.

FIG. 2C illustrates an architecture where the merchant system 110 and the payment handler 120 are integrated into a single device. The payment handler 120 may be software, hardware or firmware within the merchant system 110. The payment handler 120 may receive the payment amount from the merchant system 110. The merchant system 110 may include an electronic payment interface for accepting electronic payment information and may provide the electronic payment information to the payment handler 120.

When a merchant and a payment processing system 140 (payment processor) execute an agreement for the payment processor to handle electronic payment transactions for the merchant the payment processor creates a merchant account for the merchant that identifies the merchant and defines parameters associated with the merchant agreement. The merchant account may define the types of transactions authorized and include various identifications (e.g., merchant ID, payment processor ID, merchant account ID). The merchant account may be stored in the payment processing system 140. The payment processing system 140 may utilize the p merchant account to identify incoming electronic payment transactions with the merchant, validate the electronic transactions, and process the electronic payment transactions according to the merchant agreement. The payment processing system 140 may require the incoming electronic payment transactions to be a certain format and contain certain data from the merchant account in order to identify, validate and process the electronic payment transactions.

Regardless of the type of payment handler 120 used, in order for the electronic payment transactions to be processed the payment handler 120 needs to be configured in order to communicate with the payment processing system 140. The configuration of the payment handler 120 may include defining the format of electronic payment transactions required by the payment processing system 140. The payment handler 120 may include software (processor application) that defines the electronic payment transaction format required by the payment processing system 140 that will be processing the electronic payment transactions for the merchant. The payment handler 120 provided to the merchant may have the appropriate processor application loaded for the payment processing system 140.

In addition, the payment handler 120 may include a profile that defines parameters regarding the merchant agreement (merchant profile) stored therein. The merchant profile may be similar to the merchant account, and the two may contain at least a portion of the same data. The merchant profile may contain data that is required in the electronic payment transaction format for the associated payment processing center 140. The payment handler 120 may create the electronic payment transaction based on the processor application, the merchant profile, and the payment amount.

Referring back to FIG. 1, the merchant profile may be created by a configuration system 150. The configuration system 150 may receive data about an established merchant account from the payment processing system 140 and create the merchant profile therefrom. The configuration system 150 may also maintain processor applications used by the payment handlers 120 to create the electronic payment transactions for each of the payment processing systems 140. The merchant profile may be created to work with a specific processor application.

The installation and configuration of the payment handler 120 at a merchant location requires that the appropriate processor application and the merchant profile be loaded therein, which is usually too complicated for the typical merchant. Accordingly, vendors are typically utilized to install and configure the payment handlers 120 for merchants. The vendors may be associated with the payment processing systems 140 or may be independent therefrom. The vendors need to obtain an appropriate payment handler 120 having an appropriate processor application loaded thereon. The vendors need to coordinate with the configuration system 150 in order to ensure the merchant profile is created (can not proceed with installation until the client profile is created by the configuration system 150).

The vendors may obtain the merchant profile from the configuration system 150 by programming the payment handler 120 to request a merchant profile for the specific merchant agreement (the request may need to include multiple identifications associated therewith, such as, merchant ID and merchant agreement ID). The vendors may alternatively obtain the merchant profile by contacting the configuration system 150 directly (e.g., via phone, fax, email) and requesting a download. The vendors may obtain/load the merchant profile prior to arriving at the merchant location to install the payment handler 120 or may obtain/load the merchant profile at the time of installation from the merchant location. The installation of the payment handler 120 includes connecting to merchant system 110 and the communication network 130.

Once the payment handler 120 is installed and configured, an electronic payment transaction may be processed to ensure it is processed correctly. Any errors in the processing of the electronic payment transaction require troubleshooting and may require communications between at least some subset of the vendor, the configuration system 150, the payment processing system 140, and the merchant. The troubleshooting may determine, for example, that the merchant profile created has errors and require the configuration system 150 to recreate the merchant profile, may determine that the merchant profile was loaded incorrectly or the wrong merchant profile was loaded and require the merchant profile to be reloaded, or may determine that the processor application was loaded incorrectly or the wrong processor application was loaded and require the processor application be made available to the vendor for download. The delivery, installation, configuration and validation of the payment handler 120 is a significant cost factor in deploying a new merchant account.

Furthermore, if the merchant profile or the processor application becomes corrupt the payment handler 120 may need to be reconfigured. Additionally, if attributes related to the merchant account change (e.g., allow additional transactions) the payment handler 120 may need to be reconfigured. Moreover, if the payment processing system 140 is modified (e.g., data required or format of electronic payment transaction changes, payment processing system 140 contact information (e.g., IP address) changes) the payment handler 120 may need to be reconfigured. The reconfiguration of the payment handler 120 may require the vendor to return for reconfiguration thereof, the payment handler 120 to be returned for reconfiguration, or replaced with a unit that has been reconfigured. Alternatively, the merchant may be provided with instructions that enables them connect to the configuration server 150 in order to download the merchant profile and/or processor application from the configuration system 150. Regardless of the form of reconfiguration utilized, it may result in delays and additional costs.

The payment handlers are typically not tracked and/or associated with merchants. Accordingly, vendors or other parties that have an account with the configuration system 150 and know how to configure a payment handler 120 can establish communication with the configuration system 150 and have a merchant profile associated with a particular merchant loaded on any payment handler 120 having the appropriate processor software loaded thereon (merchant need not purchase or rent payment handler 120). Furthermore, vendors or other parties could establish communication with the configuration system 150 and arrange to have a processor application associated with a merchant account downloaded onto payment handlers not originally associated with that payment processor. The coordination with the configuration system 150 to download merchant profiles and/or processor applications associated with a merchant account enables a payment handler 120 to be reused by the same merchant for different merchant agreements or to be used by different merchants. The reprogramming of the payment handlers 120 creates an aftermarket for the devices that is out of the control of the payment processors or equipment manufactures. The aftermarket reduces the amount of payment handlers 120 required for new merchant accounts and thus reduces the profits the payment processors or equipment manufactures can make by charging for the devices as part of the merchant contract.

What is needed is a way to simplify/expedite the creation of the merchant profile, simplify the configuration/reconfiguration of the payment handlers 120, and control the merchant profiles and processor applications that can be loaded onto payment handlers 120 in order to control use thereof.

BRIEF DESCRIPTION OF THE DRAWINGS

The features and advantages of the various embodiments will become apparent from the following detailed description in which.

DETAILED DESCRIPTION

Figure 1:
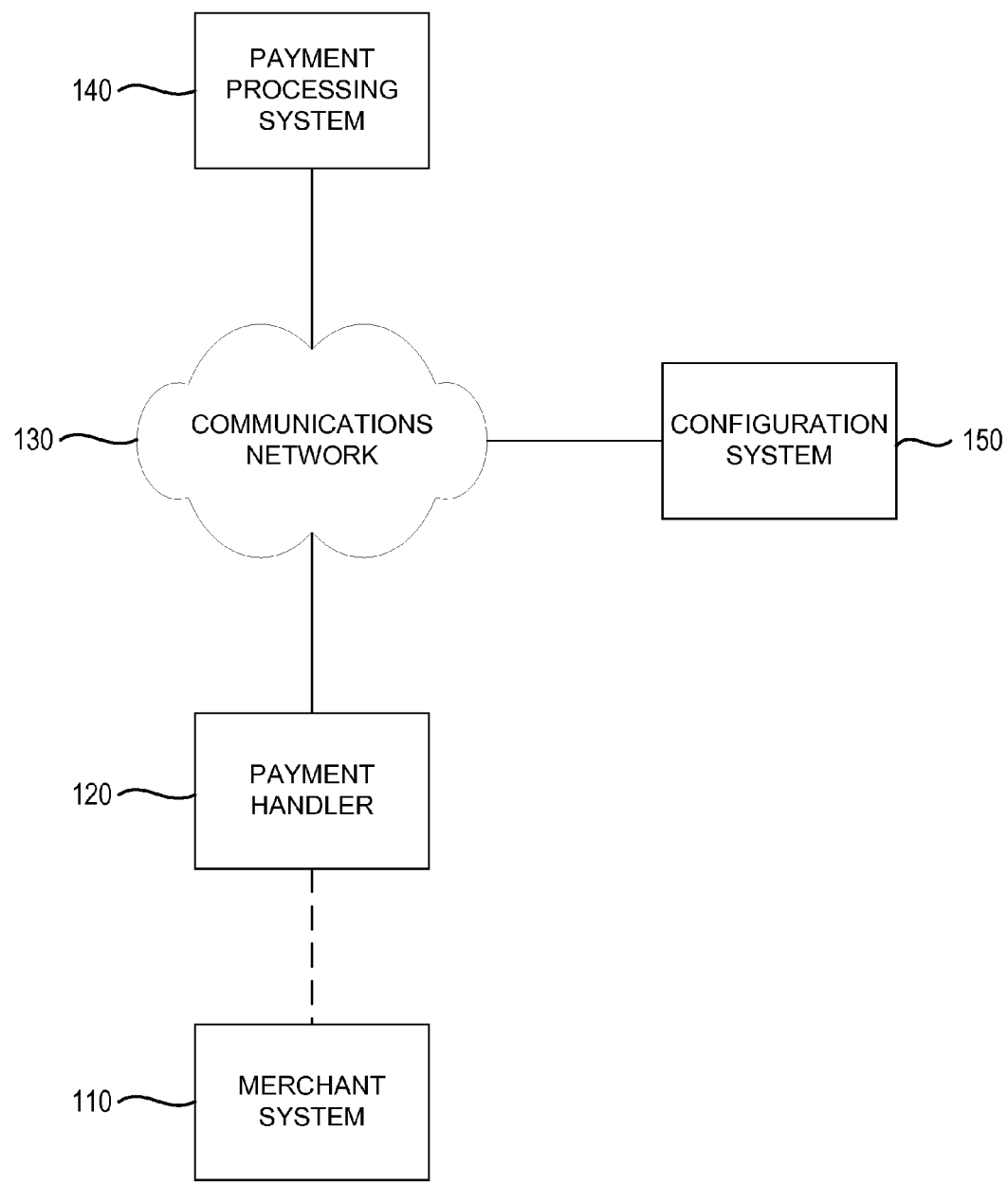
FIG. 1 illustrates an example architecture used to process electronic payments for merchant transactions, according to one embodiment.
Figure 2A:
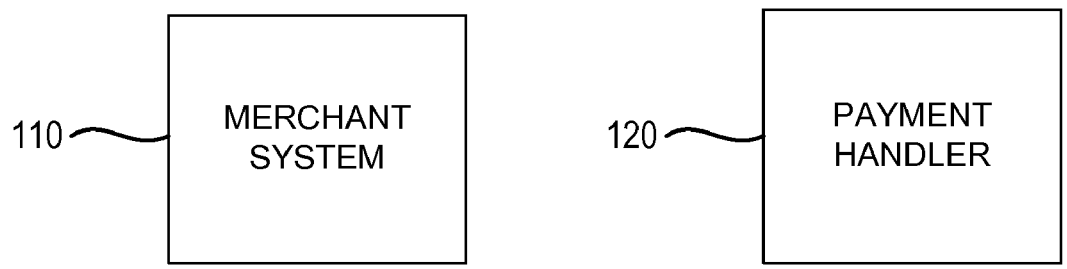
FIGS. 2A-2C illustrate several example merchant system-payment handler architectures, according to one embodiment.
Figure 2B:
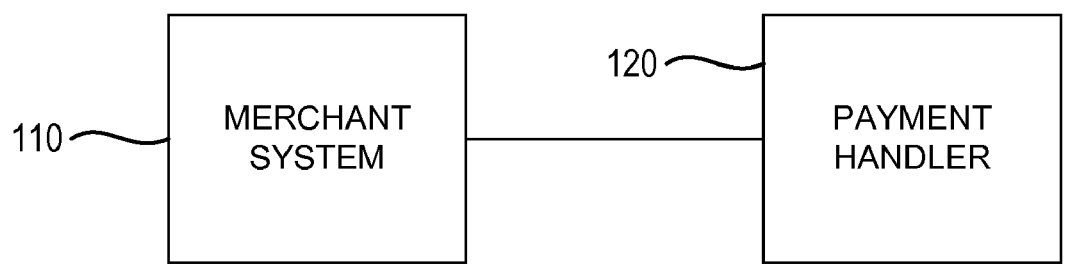
Figure 2C:
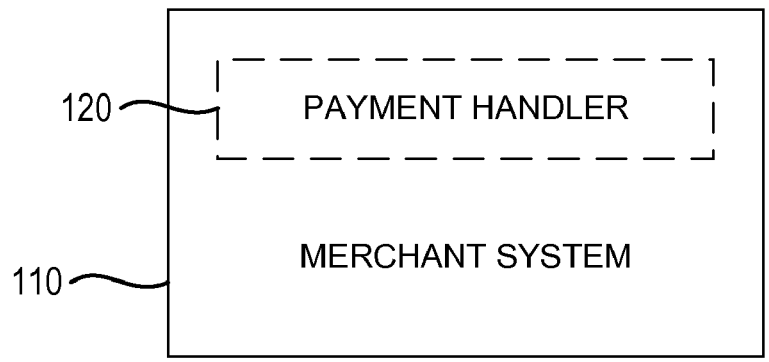

A configuration system (e.g., 150) may work with numerous payment processing systems (e.g., 140) to develop processor applications and merchant profiles used for enabling payment handlers (e.g., 120) to operate therewith (create electronic payment transactions with correct data and in correct format). The configuration system (payment systems configuration server (PSCS)) may develop the processor applications in order to create and format electronic payment transactions as required by the payment processing system in order to process electronic payment transactions. The configuration system may create merchant profile templates that define the necessary parameters regarding the merchant account for the specific payment processing systems. The configuration system may then create the merchant profiles by entering data related to the merchant account into the merchant profile template.

In order to expedite the development and loading of the merchant profiles the configuration system may provide the payment processing systems, equipment manufactures, dealers, installers, system integrators, financial service sales companies, vendors, merchants, or other parties associated with the execution of a merchant account and the installation and configuration of the payment handler required to process electronic payment transactions (hereinafter referred to as merchant account parties) access to the configuration system. Each of the authorized merchant account parties may be provided with an account in the configuration system. The accounts may provide the merchant account parties access to the configuration system to create merchant profiles and download the merchant profiles for storage on the payment handlers.

The merchant account parties may log into the system and access an appropriate merchant profile template that they utilize to create the merchant profile for the merchant based on the merchant account. The login may direct the merchant account party to the appropriate template if the merchant account party (or that particular login) is associated with a single payment processing system. If the merchant account party deals with multiple payment processing systems or deals with multiple different account types (that require different merchant profiles) for a single payment processing system the merchant account party may have to select the appropriate template after logging in.

The access to the configuration system enables the merchant account parties to create the merchant profiles remote from the configuration system. The access may be via a web based interface or may be via a direct connection to the configuration system. The merchant account party may be provided with a screen (or screens) that prompts them for the data necessary to create the merchant profile. After the merchant account party has entered the data, the configuration system may validate that all necessary data has been entered and is the appropriate format (e.g., merchant identification is correct number of characters). Once the data is validated the merchant profile may be created.

In an alternative embodiment, the merchant account party may upload a file into the configuration system rather then entering the data. The uploaded file may be a merchant profile (contain same data and be in same format). Alternatively, the uploaded file may be a format that the configuration system can extract data from in order to create the merchant profile. The configuration system may validate the uploaded data.

When a merchant account is established in the payment processing system, a merchant account party may access (log in to) the configuration system to create the merchant profile as soon as the merchant account is created and the information is available. The merchant profile may be created anywhere the merchant account party has access to the configuration system (e.g., anywhere they have web access). The merchant account party may create the merchant profile prior to installation at the merchant location or while performing the installation. The created merchant profile may be loaded/stored in the payment handler at the time it is created or may be stored at a later time.

The payment handler utilized may have the processor application preloaded therein (may take a payment handler associated with the payment processing system). Alternatively, the merchant account party may access the configuration system and have the appropriate processor application downloaded. The processor application may be loaded/stored on the payment handler at any time up through installation at the merchant site. The processor application and the merchant profile may be loaded/stored at the same time.

The merchant account party that creates the merchant profile (merchant profile creator) may control access to and/or modification of the merchant profile (ID/password protected) as well access to the processor application. The merchant profile creator may also load the merchant profile/processor application on the payment handler and/or install the payment handler. Alternatively, the merchant profile creator may provide other merchant account parties with access to the configuration system in order to load the merchant profile/processor application on the payment handler. The merchant profile creator may grant access to other parties by providing the ID/password (thus giving full access) or may create guest accounts that may provide a range of access authority. The merchant profile creator may assign control thereof to another merchant account party (e.g., sales may assign to installers).

A computing device (e.g., laptop computer) may be utilized to assist the payment handler contact the configuration system in order to have the merchant profile/processor application downloaded thereto for storage therein. The merchant profile/processor application may be downloaded from the configuration system via the communications medium associated with the payment handler. Alternatively, the configuration system may download the merchant profile/processor application to the computing device (presumably a faster connection and processor resulting in a faster download) and the computing device may load the merchant profile/processor application on the payment handler.

Figure 3:
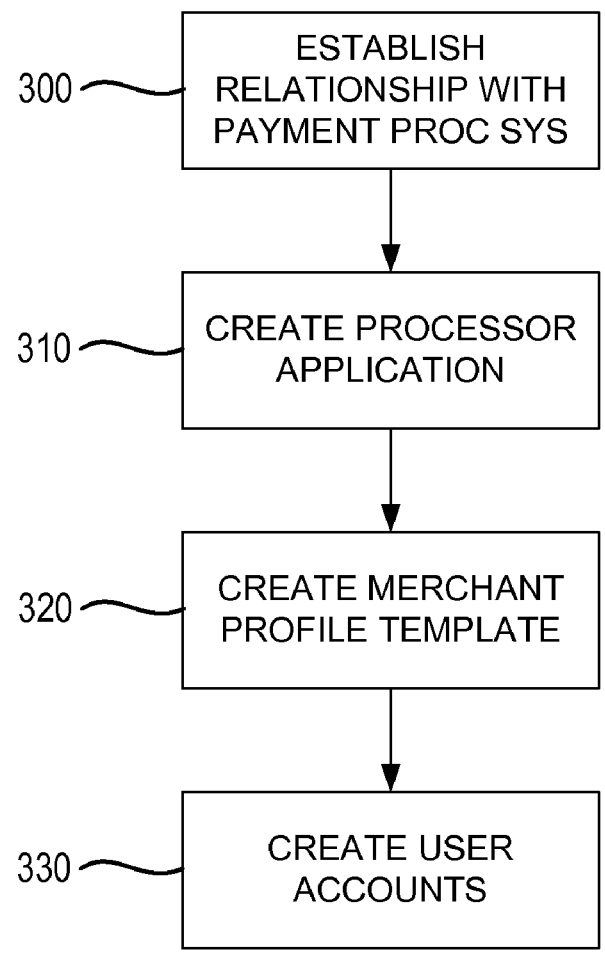
FIG. 3 illustrates an example process flow for providing access to the configuration system, according to one embodiment.

FIG. 3 illustrates an example process flow for providing access to the configuration system. Initially, the operator of the configuration system establishes a relationship with a payment processing system in which the configuration system agrees to support transactions thereto 300. The configuration system generates a processor application that is used by a payment handler to generate electronic payment transactions in a format required by the payment processing system 310. The configuration system then generates a merchant profile template that identifies all the merchant/merchant account specific data that is necessary to process the electronic payment transactions 320. The merchant profile template and the processor application are linked together. The configuration system identifies parties that may have access to the configuration system in order to create merchant profiles for merchants that enter into merchant agreements with the payment processing system 330. The parties may include the payment processing systems, equipment manufactures, dealers, installers, system integrators, and financial service sales companies.

Figure 4:
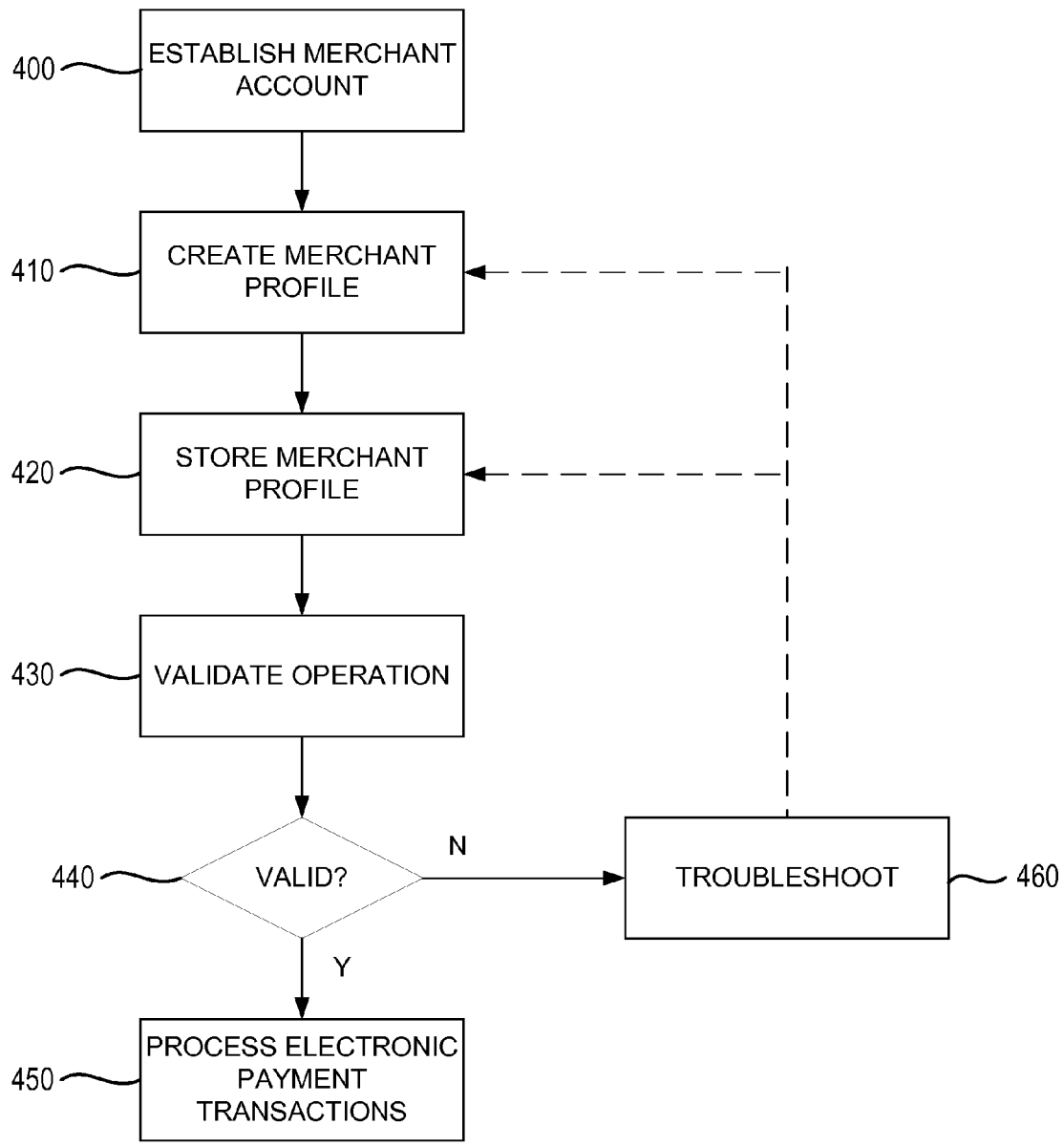
FIG. 4 illustrates an example process flow for establishing a merchant account and processing electronic payment transactions therefore, according to one embodiment.

FIG. 4 illustrates an example process flow for establishing a merchant account and processing electronic payment transactions therefore. Initially, a merchant agreement is entered into between a payment processor and a merchant that identifies various electronic payment transaction parameters. The merchant agreement may be entered into by the payment processor or by other entities selling merchant accounts for the payment processor. A merchant account is created in the payment processing system 400 based on the agreement. The merchant account may include various identifications (e.g., account, merchant). Once the merchant account is established a merchant account party may utilize the configuration system to create a merchant profile 410.

The merchant profile created may be downloaded to a payment handler to be utilized by the merchant 420. The merchant profile may be stored therein for processing of electronic payment transactions. The payment handler may already be associated with the appropriate payment processing system (processor application already loaded therein) or the processor application may also be downloaded to and stored on the payment handler as part of the installation/configuration.

The installation/configuration of the payment handler may include validating the operation of the payment handler by processing one or more test electronic payment transactions 430. If the test transactions are processed/validated 440 Yes, the merchant can process electronic payment transaction 450. If the test transactions can not be processed/validated 440 No, the merchant account party needs to troubleshoot 460. The troubleshooting may include modifying the merchant profile created (420) or restoring/reloading the merchant profile (430).

The payment handlers may be assigned a unique identification (e.g., serial number, device identification (DID)). The unique ID may be programmed in the payment handler as a permanent identification that may not be modified. The unique ID may be programmed into the payment handler by a manufacturer when the payment handler is produced. For a hardware payment handler the unique ID may be programmed into non-volatile, non-programmable memory. For a software payment handler the unique ID may be stored in the program. The unique ID may be presented on the payment handler (e.g., with a label affixed thereto, engraved therein) so that the unique ID is known.

The unique ID of the payment handler used by a merchant may be linked to the merchant profile for the merchant. The unique ID may be linked to the merchant profile by a merchant account party. The unique ID may be associated with the merchant profile when the merchant profile is created or after the profile is created. The unique ID may be associated with the merchant profile prior to installation at the merchant location or during installation. The association of the unique ID to the merchant profile may be required to activate the merchant account.

The unique ID may be utilized by the configuration system to manage and control the use of the payment handlers. For example, the configuration system may track whether the payment handler was purchased and/or rented by the merchant, what processor application is associated with the payment handler and whether the processor application has been purchased and/or rented, and whether there is a service contract on the payment handler. Tying the various parameters to unique ID enables the configuration system to control what level of access should be provided to what payment handlers. The configuration system may turn processor application access on or off, or charge for processor applications, depending on the status associate with the unique ID.

For example, if the payment handler was purchased with an associated processor application, during installation of the payment handler a merchant account party may access the configuration system and provide the unique ID. The configuration system may look up the status of the unique ID and after validating the status of the unique ID may download a processor application and possibly the merchant profile associated therewith. The access to the configuration system may be via the computing device. The download may be directly to the payment handler.

If a merchant account party accesses the configuration system and attempts to load a different processor application onto the payment handler, the configuration system may determine that the unique ID is not associated with that processor application and disallow the load, or allow for it with payment for the new processor application. If a merchant account party attempts to reload the processor application and/or merchant profile for a rented payment handler and/or rented processor application and the rent has not been paid the configuration system may preclude the load until the rent is paid.

If the payment handler can not access the merchant profile when it attempts to create an electronic payment transaction it may send the configuration system a request for a down load of the merchant profile where the request includes the unique ID. The configuration system validates the unique ID and determines the merchant profile associated therewith and downloads the merchant profile to the payment handler. The configuration system may automatically download the appropriate processor application with the merchant profile.

If the payment handler experiences problems, the merchant account party (possibly the merchant) may access the configuration system and request that the payment handler be reconfigured (e.g., have merchant profile and/or processor application reloaded).

If it is determined that the merchant profile needs to be recreated, a merchant account party may access the configuration system and create the new merchant profile and have the new profile downloaded to the payment handler (the associated processor application may also be downloaded).

If it is determined that there is a problem with the payment handler and that a new unit is required, a merchant account party may access the configuration system and change the unique ID associated with the merchant account and then download the appropriate data to the new payment handler. The new payment handler preconfigured can be delivered to the merchant for installation. The unique ID of the old payment handler may remain associated with the merchant in an inactive state until the merchant returns the payment handler. If the merchant doesn't return the unit they may be charged accordingly. Once the payment handler is returned it may be disassociated with the merchant. If the returned payment handler is repaired the unique ID may be reprogrammed and the unit may be made available for a new merchant. The unique ID is reprogrammed rather releasing the existing unique ID in order to avoid inadvertent processing of transactions for the new merchant to the old merchant.

A merchant account may provide limited reloads and/or reconfigures unless a service agreement is purchased. When a merchant account party attempts to reload and/or reconfigure a payment handler the configuration system may determine if a service agreement is in place for the unique ID. If a service agreement is in place the configuration system may allow reloading/reconfiguring. If a service agreement is not in place and the number of reloads/reconfigurations has been exceeded the configuration system may not allow the reload/reconfiguration, may charge for the reload/reconfiguration or may provide the option to purchase a service agreement.

The remote access to the configuration system by merchant account parties to create merchant profiles and to load the merchant profiles and/or the processor applications expedites the creation, configuration and troubleshooting time. The use of the unique ID makes access to the appropriate account easier and also provides the configuration system with additional management and control over the payment handlers and the merchant accounts.

According to one embodiment, a processing switch (multi merchant processing server (MMPS)) is utilized to receive electronic payment transactions that are only identified by the unique ID, look up the merchant profile and processing application associated with the unique ID, and reconfigure the electronic payment transactions to include the associated merchant profile prior to forwarding the electronic payment transactions to the payment processing system. Accordingly, the payment handlers need not have the merchant profile loaded therein. Furthermore, the payment handlers may contain the same processor application regardless of what payment processing system is processing the electronic payment transactions. The processor application may create and format the electronic payment messages in a format that may be processed by the processing switch. The processing switch may have various processor applications stored therein that define the different formats necessary for creating electronic payment transactions for the payment processing systems that it supports.

Figure 5:
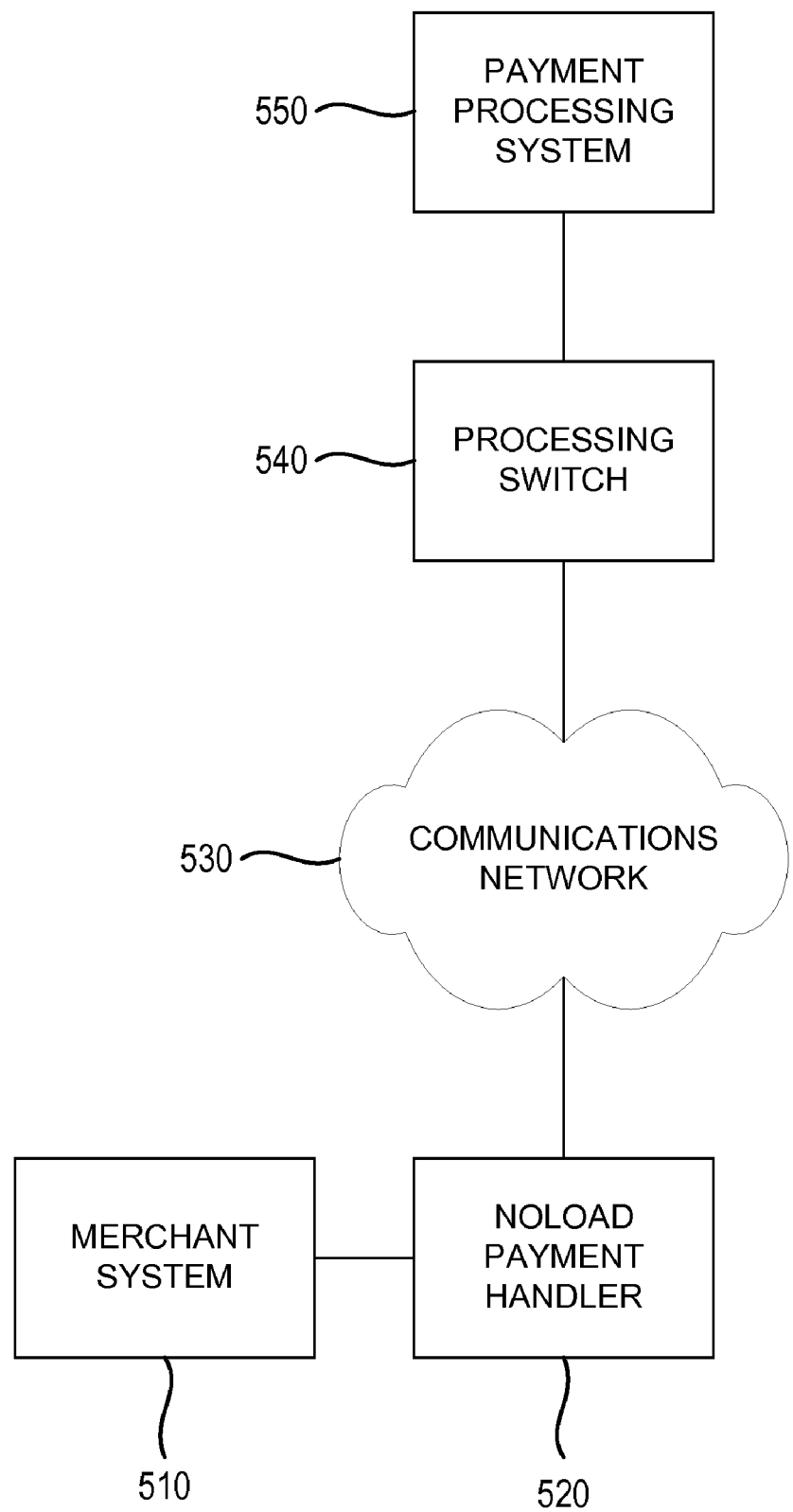
FIG. 5 illustrates an example no-load architecture used to process electronic payments for merchant transactions, according to one embodiment.

FIG. 5 illustrates an example architecture used to process electronic payments for merchant transactions. The architecture includes the merchant system 510, the payment handler 520 having a unique ID, the communication network 530, the processing switch (MMPS) 540, and the payment processing system 550.

The payment handler 520 may receive transaction data (payment amount) and electronic payment information and process the information to create an electronic payment transaction. The payment handler 520 may add the unique ID in the electronic payment transactions. The unique ID may be embedded into the electronic payment transaction or may be included in header data for the electronic payment transaction message. The payment handler 520 does not require programming/configuration of the merchant profile and does need not to have memory for storing the merchant profile.

The processing switch 540 may store client side merchant profiles for various merchant accounts (and associated merchants) and may associate the unique ID of the payment handler 520 used by the merchant with the merchant (and their client side merchant profile). The processing switch 540 may receive the electronic payment transactions from the payment handlers 520 having the unique ID included and may look up the unique ID and retrieve the associated merchant profile and associated processor software. The processing switch 540 may then reformat the electronic payment transaction in accordance associated processor software and the merchant profile and forward the reformatted electronic payment transaction to the payment processing system 550.

The use of a unique ID for the payment handler 520, and the correlation of the unique ID to the merchant profile in the processing switch 540 enables the configuration required to process electronic payment transactions for a merchant to be moved upstream from the payment handler 520 to the processing switch 540. The formatting of the electronic payment transactions, and inclusion of the merchant profile therein, required by the payment processing system 550 is performed by the processing switch 540 instead of the payment handler 520.

The processing switch 540 may provide merchant account parties access thereto to create merchant profiles, to associate the merchant profiles to the unique ID for the associated payment handler 520, and to configure the payment handlers (e.g., download processor application that formats electronic payment transactions for the processing switch). The processing switch 540 may be utilized to manage and control the use of the payment handlers 520 as described above with respect to the configuration system 150.

Figure 6:
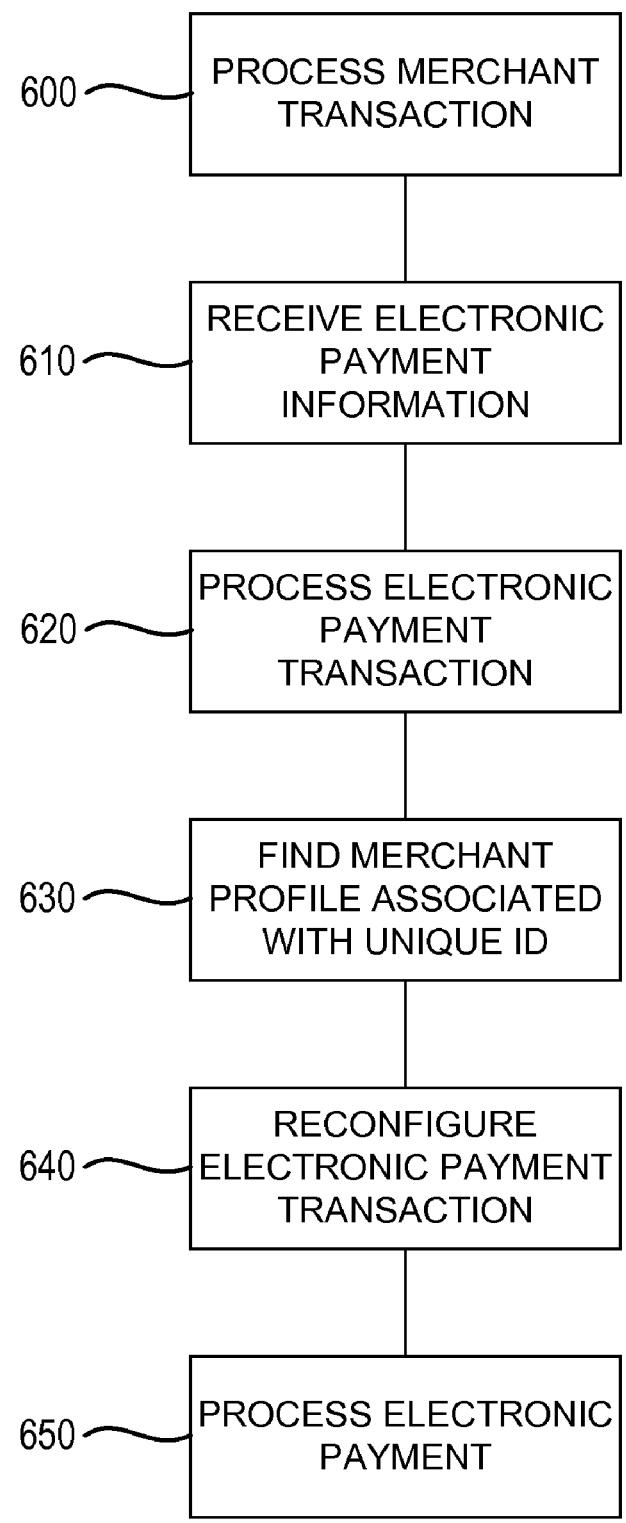
FIG. 6 illustrates an example process flow for processing electronic payment transactions using the example architecture of FIG. 5, according to one embodiment.

FIG. 6 illustrates an example process flow for processing electronic payment transactions using the example architecture of FIG. 5. Initially the merchant system processes a transaction for a customer 600. Electronic payment information (e.g., credit card number) is received from the customer to pay for the transaction 610. The transaction information (payment amount) and the electronic payment information are provided to the payment handler where the information is processed and the unique ID associated therewith is added to create an electronic payment transaction and the electronic payment transaction is forwarded to the processing switch 620. The payment handler may be configured to communicate with the processing switch.

The processing switch extracts the unique ID and looks up the merchant profile associated therewith 630. The processing switch then reformats the electronic payment transaction in accordance with the merchant profile 640. The reconfiguration includes removing the unique ID and adding the data that the payment processing system requires in order to validate and process the electronic payment. The reformatted electronic payment transaction is provided to the payment processing system where the electronic transactions are processed 650.

The payment handlers described above with respect to FIGS. 1-6 may be provided in various different configurations. The configurations may be based on the type of merchant system and communication network being utilized. The payment handlers may have a unique ID associated therewith. The payment handlers may include memory and have the merchant profile and processor application stored therein if the electronic payment transactions are formatted for and provided to the payment processing system.

Figure 7A:
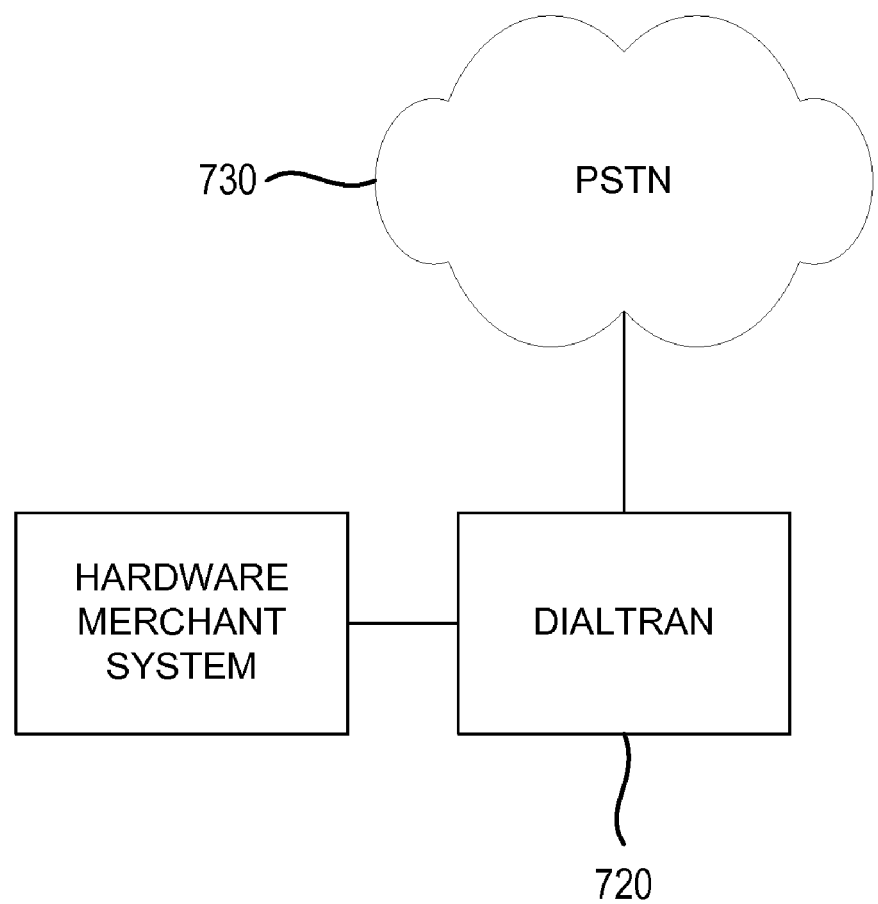
FIGS. 7A-D illustrate several example merchant system-hardware payment handler configurations, according to one embodiment.

FIGS. 7A-D illustrate several example merchant system-hardware payment handler configurations. FIG. 7A illustrates an example configuration where the communications network 730 utilized is the public switched telephone network (PSTN). The payment handler 720 (DialTran) may include a processor to process the transactions and a telephone modem (communication device) and a telephone jack (output interface) to transmit the transactions over the PSTN 730. For ease of illustration, the processor, the modem, and the jack are not illustrated. A telephone cable may be used to connect the DialTran payment handler 720 to the PSTN 730. Alternatively the telephone modem may be separate from the DialTran 720 and connected thereto. As there are a plurality of different modems that utilize different operational parameters configuration problems may occur in this alternative embodiment. Accordingly, the DialTran 720 may be configured to work with a select number of modems and the system will only be guaranteed to work (avoid configuration problems) with one of the select modems.

Figure 7B:
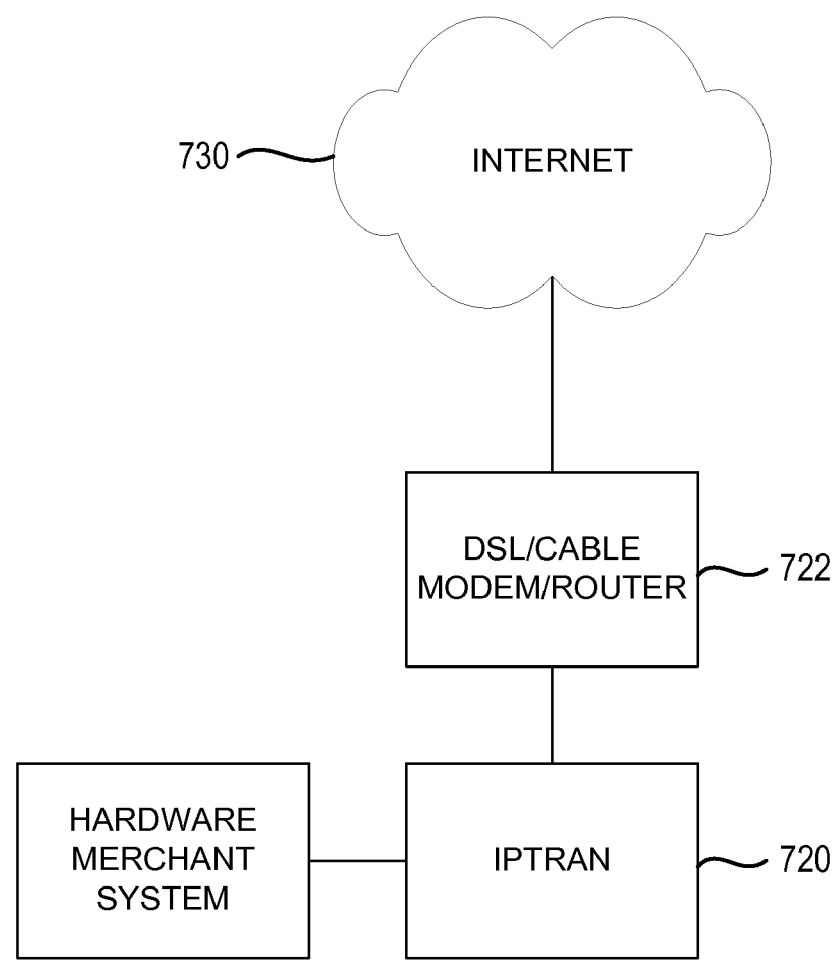

FIG. 7B illustrates an example configuration where the communications network 730 utilized is the Internet. The payment handler 720 (IPTran) may include a processor (not separately illustrated) to process the transactions and break the data into packets for transmission over the Internet 730. The IPTran payment handler 720 may be physically connected to a DSL data modem and/or router (DSL/Cable router/modem) 722 via an Ethernet cable or may have a wireless connection therebetween. The DSL/Cable router/modem 722 may provide connectivity to the Internet 730 via telephone or coaxial cable. As there are a plurality of different modems/routers 722 that utilize different operational parameters configuration problems may occur. Accordingly, the IPTran 720 may be configured to work with a select number of modems/routers for each type of Internet connection (e.g., DSL, cable) and the system will only be guaranteed to work (avoid configuration problems) with one of the select modems/routers. Alternatively, the DSL/cable router/modem 722 may be included within the IPTran 720. A DSL IPTran may include a DSL modem/router and a cable IPTran may include a cable modem router.

Figure 7C:
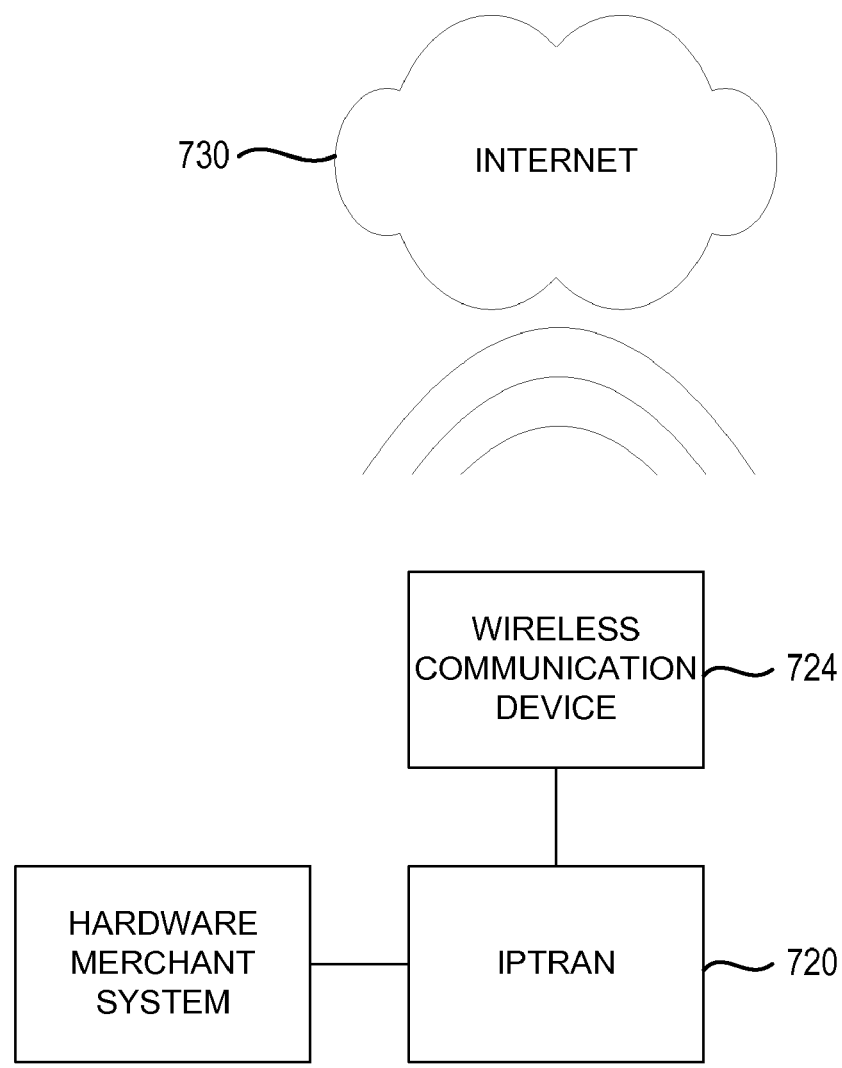

FIG. 7C illustrates an example configuration where the communications network 730 utilized is the Internet. A wireless communication device 724 (e.g., wireless network card) is used to provide wireless connectivity between the IPTran 720 and the Internet 730. Using a wireless network may be beneficial for mobile merchant systems or systems located where it may be difficult or costly to run wired telephone or Internet lines. As there are a plurality of different wireless communication devices that utilize different operational parameters configuration problems may occur. Accordingly, the IPTran 720 may be configured to work with a select number of wireless communication devices and the system will only be guaranteed to work (avoid configuration problems) with one of the select ones. Alternatively the wireless communication device 724 may be within the IPTran 720.

The merchant may desire to utilize more than one communication network for processing electronic payments (e.g., redundant networks for fallback processing). For example, the merchant may utilize the Internet as their primary communications network and the PSTN as their redundant network if Internet connection is lost. The merchant may desire to connect to the communications network in more than one fashion (e.g., wired and wireless). For example, if the merchant moves the merchant system to a remote location they may switch from connecting to the Internet via a DSL/cable modem/router to a wireless connection. The merchant could utilize multiple payment handlers to enable communications over multiple communication networks (e.g., PSTN, Internet) or to provide multiple connections (e.g., wired, wireless) to the communications network. For example the merchant may have an IPTran for Internet communications and DialTran for PSTN communications.

Preferably, the payment handler may be capable of utilizing more than one communication network or more than one connection to process electronic payment transactions. The payment handler may automatically switch from communicating over the primary communication network to the secondary network if there is a problem/failure with the primary network. The payment handler may also permit the merchant to selectively switch between which communication network is utilized or between how the connection to the communication network is established.

Figure 7D:
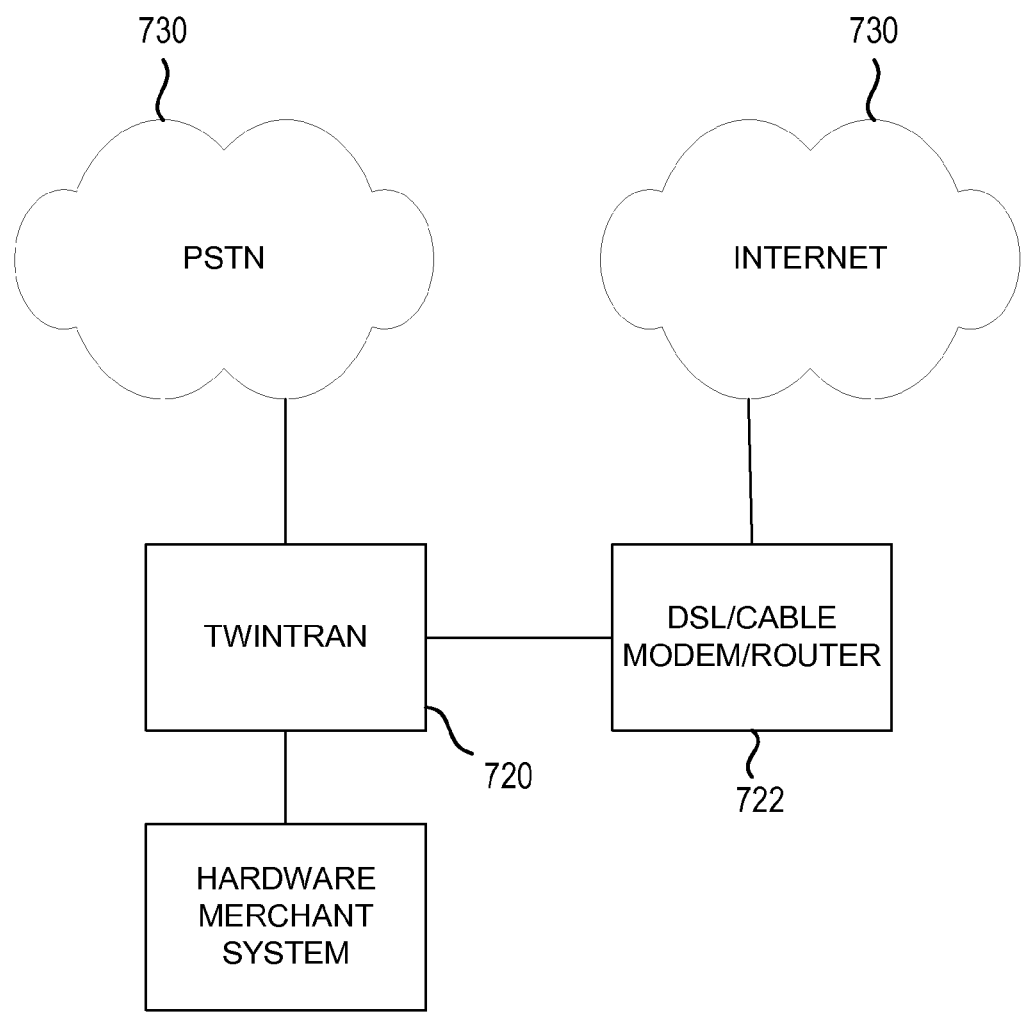

FIG. 7D illustrates an example configuration where the primary communications network 730 utilized is the Internet with the PSTN as the fallback. The payment handler 720 may be a combination of a dial link modem and an IPTran with functionality for automatically switching upon an error in the IPTran or the Internet connection or to allow manual switchover (TwinTran).

Figure 8A:
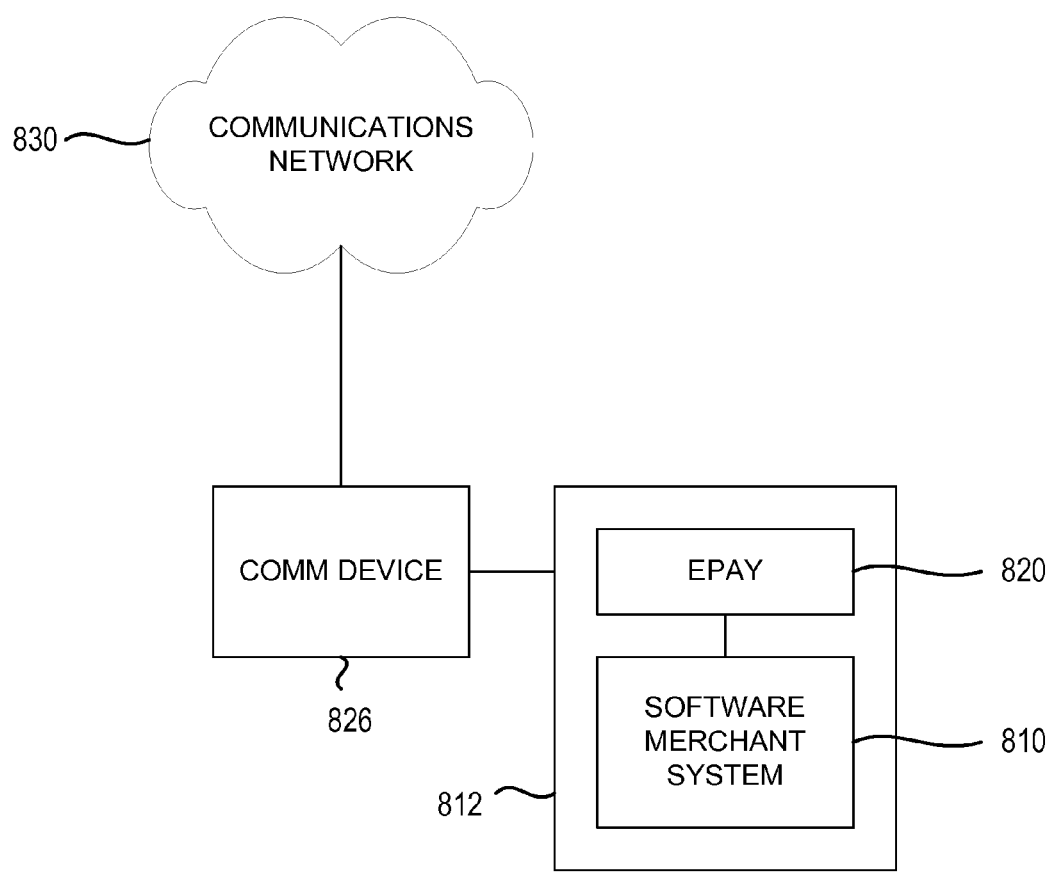
FIGS. 8A-B illustrate several example software merchant system-software payment handler configurations, according to one embodiment.
Figure 8B:
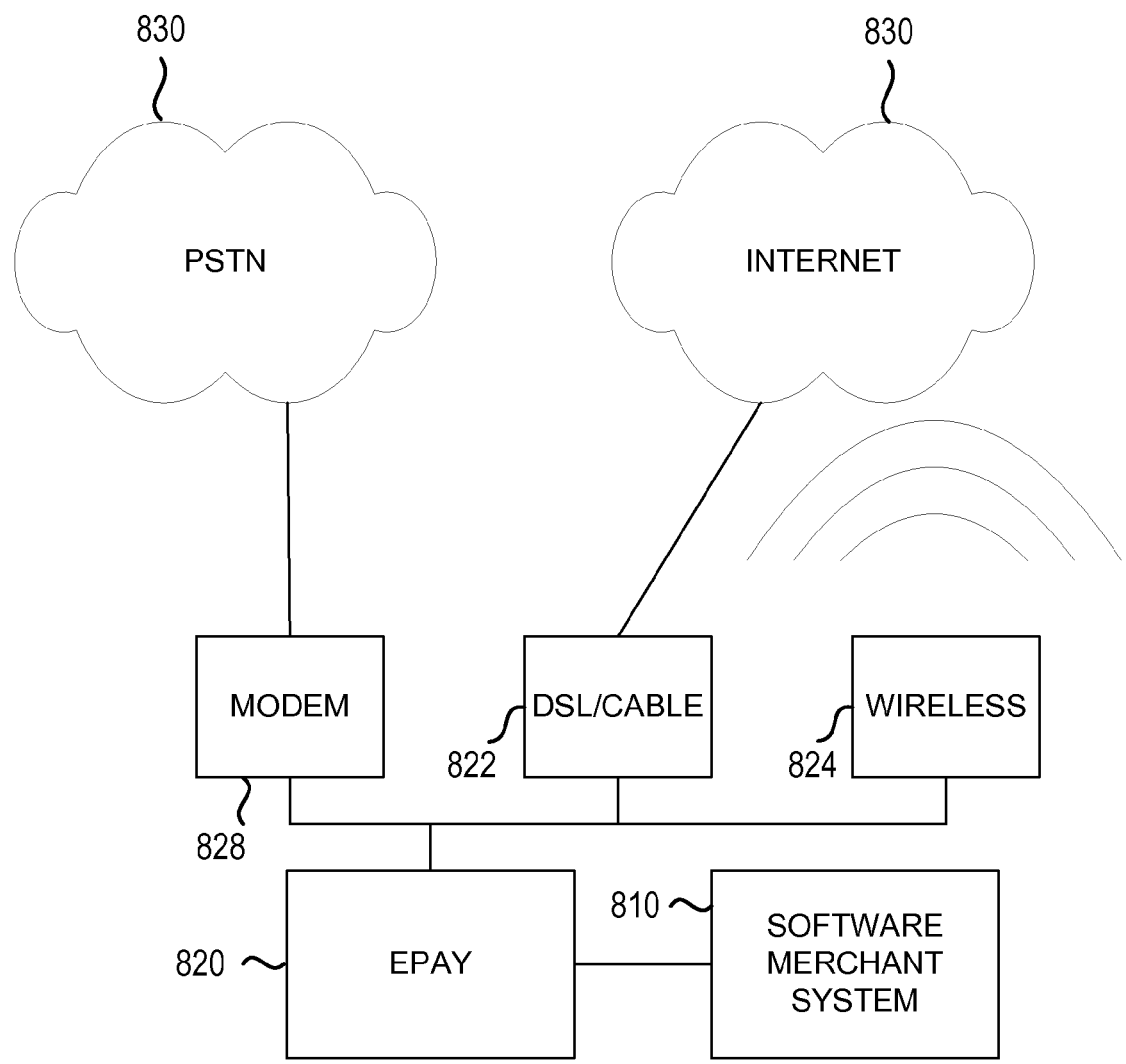

FIGS. 8A-B illustrate several example software merchant system-software payment handler configurations. FIG. 8A illustrates an example configuration where the software merchant system 810 (e.g., point of sale (POS) application) and the software payment handler 820 (ePay) are running and interfaced together on the same device (e.g., computer) 812. The unique ID used to identify the ePay 820 may be a serial number associated with the ePay 820 or may be a MAC ID associated with the device 812 the software is running on. The merchant system 810 and the ePay 820 are not limited to running on the same device. Rather, the merchant system 810 and the ePay 820 could be run on separate devices capable of communicating with one another without departing from the current scope. In fact, several merchant systems 810 could be networked to a single ePay 820.

The ePay 820 may configure the data for processing by the processor switch 840. The device 812 may be connected to a communication device (e.g., modem, DSL/Cable router/modem, wireless network card) 826 for providing connectivity to the communication network 830 (e.g., PSTN, Internet). The device 812 may be wired to the communication device 826 (e.g., via an Ethernet cable) or may have a wireless connection therebetween. Alternatively, the communication device 826 may be included within the device 812.

Like the hardware merchant system it is possible for the software merchant system to have redundant paths to communicate with the processor switch 840. For example, if the device 812 has multiple communication devices available to it, redundant communication paths can exist between the ePay 820 and the payment processing center 850.

FIG. 8B illustrates an example configuration having a modem 328 to communicate with the PSTN 830, and a DSL/Cable router/modem 822 and a wireless network card 824 to communicate with the Internet 830. The merchant system 810 and the ePay 820 may be loaded on the same device or different devices. The modem 828, the DSL/Cable router/modem 822 and/or the wireless network card 824 may be contained within the device having the ePay 820 loaded thereon or on separate devices or may be standalone devices.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various embodiments are intended to be protected broadly within the spirit and scope of the appended claims.

What is claimed:

1. A system for preparing electronic payments received by a merchant for processing, the system comprising:
    a payment handler device located at a merchant location to generate an electronic payment transaction message for processing of an electronic payment by an electronic payment processing system, wherein the payment handler device includes:
        a first interface to receive transaction information related to a sale transaction between a merchant and a consumer where the consumer is paying via an electronic payment, wherein the transaction information includes a transaction price and electronic payment information for the consumer;
        a second interface to a communication network utilized to provide external communications;
        a processor; and
        a processor-accessible storage medium to store a unique identification for the payment handler device, a merchant profile identifying parameters related to a merchant account between the merchant and an electronic payment processor, and processor executable instructions, which, when executed by the processor causes the processor to:
            upon receipt of the transaction information via the first interface, retrieve the merchant profile; and
            upon unsuccessful retrieval of the merchant profile from the processor-accessible storage medium, generate a request for the merchant profile and transmit via the second interface the request to a configuration system, wherein the request includes the unique identification for the payment handler device; and
    a configuration system to track the merchant profile associated with the merchant account and to associate the unique identification for the payment handler device provided to the merchant with the merchant account, wherein the configuration system includes:
        an interface to a communication network utilized to provide external communications; and
        a computer-accessible storage medium to track merchant accounts and to store for each merchant account the associated merchant profile and the unique identification for the payment handler device assigned thereto, and computer executable instructions, which, when executed by a computer causes the computer to:
            upon receipt via the interface of the request for the merchant profile from the payment handler device, determine if the unique identification included in the request is associated with a merchant account; and
            upon determination the unique identification is associated with a merchant account, retrieve the associated merchant profile and transmit via the interface the associated merchant profile to the payment handler device.

2. The system of claim 1, wherein when executed by the processor the processor executable instructions further cause the processor to, upon successful retrieval of the merchant profile from the processor-accessible storage medium, generate the electronic payment transaction message from the transaction information and the merchant profile and transmit via the second interface the electronic payment transaction message to the electronic payment processing system, wherein portions of the transaction information and the merchant profile are included in the electronic payment transaction message and the electronic payment transaction message is configured in a format required by the electronic payment processing system.

3. The system of claim 1, wherein when executed by the processor the processor executable instructions further cause the processor to upon receipt via the second interface of the merchant profile from the configuration server, store the merchant profile in the processor-accessible storage medium.

4. The system of claim 1, wherein the first interface includes a connection to a merchant point of sale system.

5. The system of claim 1, wherein the first interface includes a user interface for the merchant to enter the transaction information.

6. The system of claim 1, wherein the first interface includes a connection to an electronic payment reader.

7. The system of claim 1, wherein the first interface includes an electronic payment reader.

8. The system of claim 1, wherein the communication network is a telephone network.

9. The system of claim 1, wherein the communication network is the Internet.

10. A payment handler device located at a merchant location to generate an electronic payment transaction message for processing of an electronic payment by an electronic payment processing system, wherein the payment handler device includes:
- a first interface to receive transaction information related to a sale transaction between a merchant and a consumer where the consumer is paying via an electronic payment, wherein the transaction information includes a transaction price and electronic payment information for the consumer;
- a second interface to provide external communications;
- a processor; and
- a processor-accessible storage medium to store a unique identification for the payment handler device, a merchant profile identifying parameters related to a merchant account between the merchant and an electronic payment processor, and processor executable instructions, which, when executed by the processor causes the processor to:
  - upon receipt of the transaction information via the first interface, retrieve the merchant profile;
  - upon unsuccessful retrieval of the merchant profile from the processor-accessible storage medium, generate a request for the merchant profile and transmit via the second interface the request to a configuration system, wherein the request includes the unique identification for the payment handler device; and
  - upon receipt via the second interface of the merchant profile from the configuration server, store the merchant profile in the processor-accessible storage medium.

11. The device of claim 10, wherein when executed by the processor the processor executable instructions further cause the processor to upon successful retrieval of the merchant profile from the processor-accessible storage medium, generate the electronic payment transaction message from the transaction information and the merchant profile and transmit via the second interface the electronic payment transaction message to the electronic payment processing system, wherein portions of the transaction information and the merchant profile are included in the electronic payment transaction message and the electronic payment transaction message is configured in a format required by the electronic payment processing system.

12. The device of claim 10, wherein the first interface includes a connection to a merchant point of sale system.

13. The device of claim 10, wherein the first interface includes a user interface for the merchant to enter at least some subset of the transaction information.

14. The device of claim 10, wherein the first interface includes a connection to an electronic payment reader.

15. The device of claim 10, wherein the second interface includes a connection to a communication network.

16. A configuration system to track a merchant profile identifying parameters related to a merchant account between the merchant and an electronic payment processor and to associate a unique identification for a payment handler device provided to the merchant with the merchant account, wherein the configuration system includes:
- an interface to provide external communications; and
- a computer-accessible storage medium to track merchant accounts and to store for each merchant account the associated merchant profile and the unique identification for the payment handler device assigned thereto, and computer executable instructions, which, when executed by a computer causes the computer to:
  - upon receipt via the interface of a request for the merchant profile from the payment handler device, determine if the unique identification included in the request is associated with a merchant account, wherein the request is generated by the payment handler device when the payment handler device receives transaction information and can not access the associated merchant profile necessary to process the transaction information and wherein the request includes the unique identification; and
  - upon determining the unique identification is associated with a merchant account, retrieve the associated merchant profile and transmit via the interface the associated merchant profile to the payment handler device.

17. The system of claim 16, wherein the interface includes a connection to a communication network.

18. The system of claim 16, wherein when executed by the computer the computer executable instructions further cause the computer to reject the request if the request is not associated with a merchant account.

19. The system of claim 16, wherein when executed by the computer the computer executable instructions further cause the computer to control use of the payment handler devices.

20. The system of claim 16, wherein when executed by the computer the computer executable instructions further cause the computer to track usage status of the payment handler device including whether the payment handler device was purchased or rented, and whether a service agreement is in place.

* * * * *